United States Patent
Wakizaka et al.

(10) Patent No.: US 9,570,757 B2
(45) Date of Patent: Feb. 14, 2017

(54) FUEL CELL CATALYST LAYER AND USES THEREOF

(75) Inventors: Yasuaki Wakizaka, Tokyo (JP); Ryuji Monden, Tokyo (JP); Takuya Imai, Tokyo (JP); Hiroshi Nakajima, Sagamihara (JP)

(73) Assignee: SHOWA DENKO K.K., Tokyo (JP)

(*) Notice: Subject to any disclaimer, the term of this patent is extended or adjusted under 35 U.S.C. 154(b) by 0 days.

(21) Appl. No.: 14/240,106

(22) PCT Filed: Sep. 9, 2011

(86) PCT No.: PCT/JP2011/070582
§ 371 (c)(1),
(2), (4) Date: Feb. 21, 2014

(87) PCT Pub. No.: WO2013/035191
PCT Pub. Date: Mar. 14, 2013

(65) Prior Publication Data
US 2014/0186743 A1  Jul. 3, 2014

(51) Int. Cl.
*H01M 8/02* (2016.01)
*H01M 4/86* (2006.01)
*H01M 4/92* (2006.01)
*H01M 8/10* (2016.01)

(52) U.S. Cl.
CPC ......... *H01M 4/8657* (2013.01); *H01M 4/8605* (2013.01); *H01M 4/925* (2013.01); *H01M 2008/1095* (2013.01); *Y02E 60/50* (2013.01)

(58) Field of Classification Search
CPC .................. H01M 4/9075; H01M 4/90; H01M 2008/1095
See application file for complete search history.

(56) References Cited

U.S. PATENT DOCUMENTS

| 8,206,872 B2 | 6/2012 | Brenner et al. |
| 8,637,206 B2 * | 1/2014 | Imai ..................... H01M 4/9016 429/479 |
| 9,048,499 B2 * | 6/2015 | Wakizaka ........... H01M 4/9016 |

(Continued)

FOREIGN PATENT DOCUMENTS

| CN | 101355173 A | 1/2009 |
| JP | 2006-512736 A | 4/2006 |

(Continued)

OTHER PUBLICATIONS

S. Doi et al.; "Zirconium-Based Compounds for Cathode of Polymer Electrolyte Fuel Cell"; Journal of the Electrochemical Society; 154 (3) B362-B369 (2007).

*Primary Examiner* — Stewart Fraser
*Assistant Examiner* — Olatunji Godo
(74) *Attorney, Agent, or Firm* — Sughrue Mion, PLLC

(57) ABSTRACT

Provided is a fuel cell catalyst layer which has a catalytic performance equivalent to or higher than fuel cell catalyst layers containing platinum alone and which is inexpensive. The fuel cell catalyst layer of the present invention includes a metal oxycarbonitride-containing layer (I) and a platinum-containing layer (II). It is preferable that the mass ratio per unit area of the metal oxycarbonitride in the layer (I) to platinum in the layer (II) (metal oxycarbonitride/platinum) is 2 to 500. It is preferable that the mass per unit area of platinum in the layer (II) is 0.005 to 0.2 mg/cm$^2$.

16 Claims, 4 Drawing Sheets

(56) References Cited

U.S. PATENT DOCUMENTS

| | | | |
|---|---|---|---|
| 9,099,749 B2 * | 8/2015 | Monden | H01M 4/90 |
| 9,190,670 B2 * | 11/2015 | Wakizaka | H01M 4/9016 |
| 2002/0037449 A1 * | 3/2002 | Binder et al. | 429/42 |
| 2004/0126644 A1 | 7/2004 | Bett et al. | |
| 2007/0105008 A1 * | 5/2007 | Gu | H01M 8/0232 |
| | | | 429/483 |
| 2009/0200519 A1 | 8/2009 | Sawaki et al. | |
| 2010/0331172 A1 * | 12/2010 | Monden et al. | 502/174 |
| 2011/0008709 A1 | 1/2011 | Shishikura et al. | |
| 2011/0020729 A1 * | 1/2011 | Monden | H01M 4/90 |
| | | | 429/483 |
| 2011/0183234 A1 * | 7/2011 | Wakizaka et al. | 429/485 |
| 2012/0258381 A1 | 10/2012 | Imai et al. | |

FOREIGN PATENT DOCUMENTS

| | | | |
|---|---|---|---|
| JP | 2006-198570 A | | 8/2006 |
| JP | 2007-031781 A | | 2/2007 |
| JP | 2008-004286 A | | 1/2008 |
| JP | 2008-198437 A | | 8/2008 |
| JP | 2010-54708 A | | 3/2010 |
| JP | 2010-257720 A | | 11/2010 |
| JP | 2011-187423 A | | 9/2011 |
| WO | WO2009104500 | * | 8/2009 |
| WO | 2009/107518 A1 | | 9/2009 |
| WO | WO2009119523 A1 | * | 10/2009 |
| WO | WO2010041658 | * | 4/2010 |
| WO | 2011/077991 A1 | | 6/2011 |

* cited by examiner

# FUEL CELL CATALYST LAYER AND USES THEREOF

CROSS REFERENCE TO RELATED APPLICATIONS

This application is a National Stage of International Application No. PCT/JP2011/070582 filed Sep. 9, 2011, the contents of all of which are incorporated herein by reference in their entirety.

TECHNICAL FIELD

The present invention relates to a fuel cell catalyst layer and uses thereof.

BACKGROUND ART

Fuel cells are classified into several types according to types of electrolytes or electrodes. Typical types are alkaline types, phosphoric acid types, molten carbonate types, solid electrolyte types and polymer electrolyte types. Of these, polymer electrolyte fuel cells that can operate at temperatures ranging from low temperatures (about −40° C.) to about 120° C. have been attracting attention and have been recently developed and practically used as power sources for low pollution automobiles.

The polymer electrolyte fuel cells are expected to be used as automobile drive sources or stationary power sources. The use in these applications requires long-term durability.

The polymer electrolyte fuel cell has a structure in which a solid polymer electrolyte is sandwiched between an anode and a cathode, and a fuel is fed to the anode, and oxygen or air is supplied to the cathode, whereby oxygen is reduced at the cathode to produce electricity. The fuel is primarily hydrogen, methanol or the like.

Conventionally, to increase the reaction rate in fuel cells and enhance the energy conversion efficiency of fuel cells, a layer containing a catalyst (hereinafter, also referred to as a "fuel cell catalyst layer") is formed on the surface of a cathode (an air electrode) or an anode (a fuel electrode) of fuel cells.

As this catalyst, noble metals are generally used. Of noble metals, platinum has been primarily used, which is stable at high potential and has high activity. However, since platinum is expensive and exists in a limited amount, the development of alternative fuel cell catalysts has been desired.

As a catalyst alternative to platinum, materials containing nonmetals such as carbon, nitrogen and boron have been recently attracting attention. The materials containing these nonmetals are more inexpensive and are abundant compared with noble metals such as platinum.

Non-Patent Document 1 reports that zirconium-based $ZrO_xN$ compounds show oxygen reducing activity.

Patent Document 1 discloses, as platinum-alternative materials, oxygen-reducing electrode materials containing a nitride of one or more elements selected from Groups 4, 5 and 14 in the long periodic table.

However, the materials containing these nonmetals do not provide sufficient oxygen reducing activity for practical use as catalysts.

Patent Document 2 studies the possibility of using oxides having a perovskite structure containing two or more kinds of metals as platinum-alternative catalysts. However, as shown in its examples, the performance of the oxide does not exceed the performance of a carrier supplementing platinum, and thus sufficient activity is not achieved.

CITATION LIST

Patent Document

[Patent Document 1] JP-A-2007-31781
[Patent Document 2] JP-A-2008-4286

Non-Patent Document

[Non-Patent Document 1] S. Doi, A. Ishihara, S. Mitsushima, N. kamiya, and K. Ota, Journal of The Electrochemical Society, 154 (3) B362-B369 (2007)

SUMMARY OF THE INVENTION

Problem to be Solved by the Invention

The present invention is aimed at solving the problem in conventional art. It is an object of the present invention to provide a fuel cell catalyst layer which has a catalytic performance equivalent to or higher than fuel cell catalyst layers containing platinum alone and which is inexpensive.

Means for Solving the Problem

The present inventors studied diligently to solve the problem in conventional art, and have found that a fuel cell catalyst layer comprising a metal oxycarbonitride-containing layer (I) and a platinum-containing layer (II) has a catalytic performance equivalent to or higher than fuel cell catalyst layers containing platinum alone and is moreover inexpensive. The present invention has been made based on this finding.

The present invention relates to the following matters (1) to (17), for example.

(1) A fuel cell catalyst layer comprising a metal oxycarbonitride-containing layer (I) and a platinum-containing layer (II).

(2) The fuel cell catalyst layer described in (1), wherein the mass ratio per unit area of the metal oxycarbonitride in the layer (I) to platinum in the layer (II) (metal oxycarbonitride/platinum) is 2 to 500.

(3) The fuel cell catalyst layer described in (1) or (2), wherein the mass per unit area of platinum in the layer (II) is 0.005 to 0.2 mg/cm$^2$.

(4) The fuel cell catalyst layer described in any one of (1) to (3), wherein a metal element constituting the metal oxycarbonitride in the layer (I) is at least one metal element selected from the group consisting of aluminum, chromium, manganese, cobalt, nickel, copper, strontium, yttrium, tin, tungsten, cerium, titanium, niobium, tantalum, zirconium, vanadium, hafnium, iron, lanthanum, cerium and samarium.

(5) The fuel cell catalyst layer described in any one of (1) to (3), wherein a metal element constituting the metal oxycarbonitride in the layer (I) is at least one metal element selected from the group consisting of titanium, niobium, tantalum, zirconium, vanadium, hafnium, iron, lanthanum, cerium and samarium.

(6) The fuel cell catalyst layer described in any one of (1) to (3), wherein a metal element constituting the metal oxycarbonitride in the layer (I) is at least one metal element selected from the group consisting of titanium, niobium, tantalum, zirconium, iron, lanthanum, cerium and samarium.

(7) The fuel cell catalyst layer described in any one of (1) to (3), wherein a metal element constituting the metal oxycarbonitride in the layer (I) is at least one metal element selected from the group consisting of titanium and niobium.

(8) The fuel cell catalyst layer described in any one of (1) to (7), wherein the metal oxycarbonitride in the layer (I) is a metal oxycarbonitride containing fluorine.

(9) The fuel cell catalyst layer described in any one of (1) to (7), wherein the metal oxycarbonitride in the layer (I) is a metal oxycarbonitride containing at least one element A selected from the group consisting of boron, phosphorus and sulfur, and containing fluorine.

(10) The fuel cell catalyst layer described in any one of (1) to (9), wherein at least one layer of the layer (I) and the layer (II) further comprises electron conductive particles.

(11) The fuel cell catalyst layer described in (10), wherein the electron conductive particles are used as a carrier of platinum in the layer (II).

(12) An electrode comprising a fuel cell catalyst layer and a porous support layer, wherein the fuel cell catalyst layer is the fuel cell catalyst layer described in any one of (1) to (11).

(13) The electrode described in (12), wherein on the porous support layer, the metal oxycarbonitride-containing layer (I) and the platinum-containing layer (II) are laminated in this order.

(14) A membrane electrode assembly comprising a cathode, an anode, and an electrolyte membrane interposed between the cathode and the anode, wherein the cathode and/or the anode is the electrode described in (12) or (13).

(15) The membrane electrode assembly described in (14), wherein on the electrolyte membrane, the platinum-containing layer (II) and the metal oxycarbonitride-containing layer (I) are laminated in this order.

(16) A fuel cell comprising the membrane electrode assembly described in (14) or (15).

(17) A polymer electrolyte fuel cell comprising the membrane electrode assembly described in (14) or (15).

Advantageous Effects of the Invention

According to the fuel cell catalyst layer of the present invention, an electrode, a membrane electrode assembly and a fuel cell that are inexpensive and excellent in power generation property can be obtained.

MODE FOR CARRYING OUT THE INVENTION

<Fuel Cell Catalyst Layer>

Figure 1:
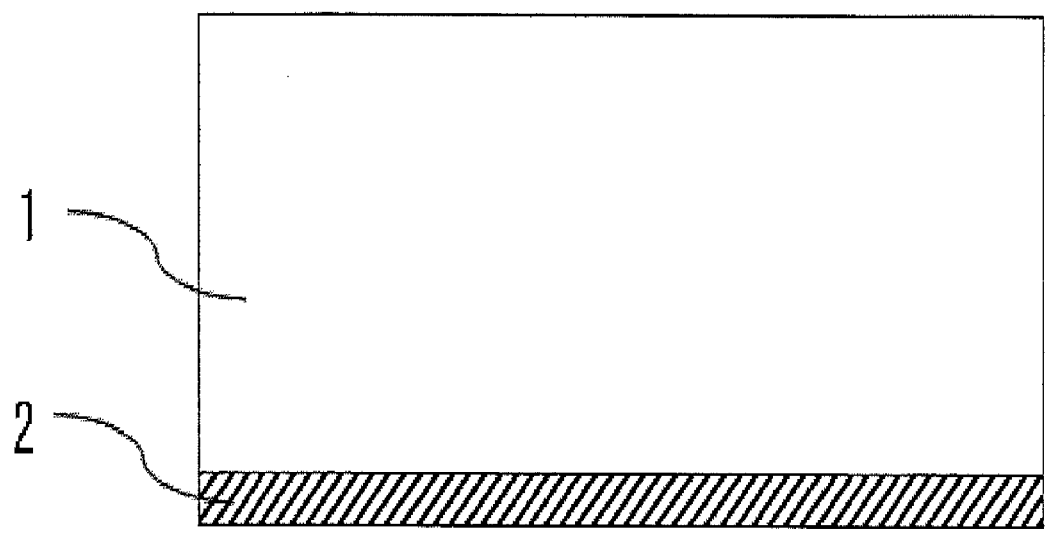
FIG. 1 is an example of a cross-sectional view of a fuel cell catalyst layer.

The fuel cell catalyst layer of the present invention comprises a metal oxycarbonitride-containing layer (I) and a platinum-containing layer (II). The simplest schematic figure of the fuel cell catalyst layer of the present invention is shown in Table 1.

The fuel cell catalyst layer comprising the layer (I) and the layer (II) has a catalytic performance equivalent to or higher than fuel cell catalyst layers containing platinum alone, and is formed from not only platinum but also a metal oxycarbonitride, and therefore is considerably inexpensive compared with fuel cell catalyst layers containing platinum alone.

The mass ratio per unit area of the metal oxycarbonitride in the layer (I) to platinum in the layer (II) (metal oxycarbonitride/platinum) is preferably 2 to 500, more preferably 7 to 300, still more preferably 20 to 200.

The mass ratio per unit area (metal oxycarbonitride/platinum) in the above range tends to provide an excellent catalytic performance. By increasing the mass of the metal oxycarbonitride and decreasing the mass of platinum, the resultant fuel cell catalyst layer is considerably inexpensive.

The mass ratio per unit area of a metal component in the metal oxycarbonitride in the layer (I) to platinum in the layer (II) (metal component in the metal oxycarbonitride/platinum) is preferably 1 to 250, more preferably 5 to 200, still more preferably 10 to 150.

The mass ratio (metal component in the metal oxycarbonitride/platinum) in the above range tends to provide excellent catalytic performance. By increasing the mass of the metal component of the metal oxycarbonitride and decreasing the mass of platinum, the resultant fuel cell catalyst layer is considerably inexpensive.

The mass ratio per unit area of a metal component in the metal oxycarbonitride in the layer (I) to platinum in the layer (II) (metal component in the metal oxycarbonitride/platinum) can be determined, for example, by the following manner.

At first, in a Pyrex (registered trademark) container, the layer (I) and the layer (II), whose areas are previously measured, are mixed with each other in an aqueous solution containing sulfuric acid and nitric acid, and the solution is heated. Further, by the addition of aqua regia, the layer (I) and the layer (II) are dissolved. The resultant solution is subjected to ICP spectroanalysis, to measure the mass of a metal component in the metal oxycarbonitride and the mass of platinum, and determine the mass ratio per unit area between these components (metal component in the metal oxycarbonitride/platinum).

The mass per unit area of platinum in the layer (II) is preferably 0.005 to 0.2 mg/cm$^2$, more preferably 0.01 to 0.15 mg/cm$^2$, still more preferably 0.05 to 0.1 mg/cm$^2$.

In general, the reduction in the mass per unit area of platinum significantly decreases the catalytic performance of the fuel cell catalyst layer. Thus, conventionally, in order to provide high catalytic performance, the mass per unit area of platinum in fuel cell catalyst layers has needed to be high, for example, 0.25 to 2.00 mg/cm$^2$.

However, by containing the metal oxycarbonitride-containing layer (I), the fuel cell catalyst layer of the present invention tends to have excellent catalytic performance in spite of having platinum in the layer (II) at a mass per unit area that is slight as shown in the above range. In addition, as a result of using platinum in a slight amount, the fuel cell catalyst layer of the present invention is considerably inexpensive.

The mass per unit area of platinum in the layer (II) is determined, for example, first by determining the mass of platinum by the method described above, and then by determining the mass per unit area of platinum in the layer (II).

The metal oxycarbonitride is preferably a metal oxycarbonitride containing at least one metal element selected from the group consisting of aluminum, chromium, manganese, cobalt, nickel, copper, strontium, yttrium, tin, tungsten, cerium, titanium, niobium, tantalum, zirconium, vanadium, hafnium, iron, lanthanum, cerium and samarium; is more preferably a metal oxycarbonitride containing at least one metal element selected from the group consisting of titanium, niobium, tantalum, zirconium, vanadium, hafnium, iron, lanthanum, cerium and samarium; is still more preferably a metal oxycarbonitride containing at least one metal selected from the group consisting of titanium, niobium, tantalum, zirconium, iron, lanthanum, cerium and samarium; is much more preferably a metal oxycarbonitride containing at least one metal element selected from the group consisting of titanium, niobium and zirconium; and is particularly preferably a metal oxycarbonitride containing at least one metal element selected from the group consisting of titanium and niobium.

The metal oxycarbonitride is preferably a metal oxycarbonitride containing fluorine, and is more preferably a metal oxycarbonitride containing at least one element A selected from the group consisting of boron, phosphorus and sulfur, and containing fluorine.

The fuel cell catalyst layer containing the metal oxycarbonitride-containing layer (I) is considerably inexpensive compared with fuel cell catalyst layers containing platinum alone, and furthermore has a catalytic performance equivalent to or higher than fuel cell catalyst layers containing platinum alone, and tends to have excellent durability in acidic electrolytes and at high potential.

The catalyst component of the layer (I) is preferably composed of a metal oxycarbonitride. As the catalyst component of the layer (I), a cocatalyst other than the metal oxycarbonitride may be contained, but is not particularly needed.

The compositional formula of the metal oxycarbonitride is a compositional formula represented, for example by (x) described below.

$$MC_xN_yO_z \quad (x)$$

wherein M is a metal atom; x, y, z are each an atomic number ratio; and $0<x\leq9$, $0<y\leq2$, $0<z\leq5$, $0.05\leq x\leq2.5$, $0.01\leq y\leq1.0$ and $0.1\leq z\leq2.0$ are preferable.

In the compositional formula (x), $0.05\leq x\leq9$, $0.01\leq y\leq2$ and $0.05\leq z\leq5$ are preferable; $0.05\leq x\leq8$, $0.01\leq y\leq1.8$ and $0.1\leq z\leq4$ are more preferable; $0.05\leq x\leq7$, $0.01\leq y\leq1.5$ and $0.1\leq z\leq3.5$ are still more preferable; $0.06\leq x\leq2.0$, $0.02\leq y\leq0.8$ and $0.2\leq z\leq1.9$ are much more preferable; and $0.1\leq x\leq1.5$, $0.04\leq y\leq0.7$ and $0.3\leq z\leq1.8$ are further preferable.

When the metal oxycarbonitride contains fluorine and further optionally contains the element A, the compositional formula of the metal oxycarbonitride is preferably a compositional formula represented by (y) described below.

$$MC_xN_yO_zA_aF_b \quad (y)$$

wherein M is a metal atom; x, y, z, a, b are each an atomic number ratio; $0<x\leq9$, $0<y\leq2$, $0<z\leq5$, $0\leq a\leq1$ and $0<b\leq2$; and A is at least one element selected from the group consisting of boron, phosphorus and sulfur.

In the compositional formula (y), the range of x is more preferably $0.15\leq x\leq9$, further preferably $0.2\leq x\leq8$, particularly preferably $1\leq x\leq7$; the range of y is more preferably $0.01\leq y\leq2$, further preferably $0.02\leq y\leq1.8$, particularly preferably $0.03\leq y\leq1.5$; the range of z is more preferably $0.05\leq z\leq5$, further preferably $0.1\leq z\leq4$, particularly preferably $0.2\leq z\leq3.5$; the range of a is more preferably $0.001\leq a\leq1$, further preferably $0.001\leq a\leq0.5$, particularly preferably $0.001\leq a\leq0.2$; and the range of b is more preferably $0.0001\leq b\leq2$, further preferably $0.001\leq b\leq1$, particularly preferably $0.001\leq b\leq0.2$.

In the compositional formulas (x) and (y), M is a metal atom, and is at least one metal selected from the group consisting of aluminum, chromium, manganese, cobalt, nickel, copper, strontium, yttrium, tin, tungsten, cerium, titanium, niobium, tantalum, zirconium, vanadium, hafnium, iron, lanthanum, cerium and samarium; is preferably at least one metal selected from the group consisting of titanium, niobium, tantalum, zirconium, vanadium, hafnium, iron, lanthanum, cerium and samarium; is more preferably at least one metal selected from the group consisting of titanium, niobium, tantalum, zirconium, iron, lanthanum, cerium and samarium; is still more preferably at least one metal selected from the group consisting of titanium, niobium and zirconium; and is further preferably at least one metal selected from the group consisting of titanium and niobium.

The fuel cell catalyst layer comprising the metal oxycarbonitride-containing layer (I) represented by the above compositional formula has high catalytic performance and tends to have excellent durability in acidic electrolytes and at high potential, and is inexpensive.

In the present invention, the metal oxycarbonitride refers to a compound the compositional formula of which is represented by $MC_xN_yO_z$ or $MC_xN_yO_zA_aF_b$; or refers to a mixture that contains an oxide of the metal, a carbide of the metal, a nitride of the metal, a carbonitride of the metal, an oxycarbide of the metal, an oxynitride of the metal and the like, the compositional formula of the mixture being represented by $MC_xN_yO_z$ or $MC_xN_yO_zA_aF_b$ as a whole wherein the mixture may contain or may not contain a compound represented by $MC_xN_yO_z$ or $MC_xN_yO_zA_aF_b$; or refers to both of the compound and the mixture.

A method for obtaining the metal oxycarbonitride is not particularly limited. Examples include a method in which a metal carbonitride is heated in an oxygen-containing inert gas, and a method in which a precursor synthesized in a liquid phase is heated in an inert gas. An exemplary heating method in a liquid phase includes a step (1) of mixing at least a metal-containing compound, a nitrogen-containing organic compound and a solvent with one another to obtain a catalyst precursor solution, a step (2) of removing the solvent from the catalyst precursor solution, and a step (3) of heat-treating a solid residue obtained in the step (2) at a temperature of 500 to 1300° C. to obtain an electrode catalyst. Further examples are a method in which in the step (1) of the method including the steps (1) to (3), a compound containing fluorine is further mixed, and a method in which in the step (1) of the method including the steps (1) to (3), a compound containing at least one element A selected from the group consisting of boron, phosphorus and sulfur, and containing fluorine is further mixed.

The metal element constituting the metal carbonitride is preferably at least one metal element selected from the group consisting of aluminum, chromium, manganese, cobalt, nickel, copper, strontium, yttrium, tin, tungsten, cerium, titanium, niobium, tantalum, zirconium, vanadium, hafnium, iron, lanthanum, cerium and samarium; is preferably at least one metal element selected from the group consisting of titanium, niobium, tantalum, zirconium, vanadium, hafnium, iron, lanthanum, cerium and samarium; is more preferably at least one metal element selected from the group consisting of titanium, niobium, tantalum, zirconium, iron, lanthanum, cerium and samarium; is still more preferably at least one metal element selected from the group consisting of titanium, niobium and zirconium; and further preferably at least one metal element selected from the group consisting of titanium and niobium.

The nitrogen-containing organic compound preferably has a functional group such as amino group, nitrile group, imide group, imine group, nitro group, amide group, azide group, aziridine group, azo group, isocyanate group, isothiocyanate group, oxyme group, diazo group and nitroso group, or a ring such as pyrrole ring, porphyrin ring, pyrrolidine ring, imidazole ring, triazole ring, pyridine ring, piperidine ring, pyrimidine ring, pyrazine ring and purine ring (these functional groups and rings are also collectively referred to as a "nitrogen-containing molecular group").

The metal-containing compound is not limited as long as being a compound containing a metal element constituting the metal oxycarbonitride. The metal-containing compound may be used singly, or two or more kinds thereof may be used. In particular, when two or more kinds of metal-containing compounds are used, the metal-containing compounds are also described as a first one and a second one for convenience sake. For example, when three kinds of metal-containing compounds are used, these are described as a first metal-containing compound, a second metal-containing compound and a third metal-containing compound.

Hereinafter, a method of heating the metal carbonitride in an inert gas containing an oxygen gas is described.

Examples of the inert gas include a nitrogen gas, a helium gas, a neon gas, an argon gas, a krypton gas, a xenon gas and a radon gas. A nitrogen gas or an argon gas is particularly preferable because of their relatively easy availability.

The concentration of the oxygen gas in the inert gas, which depends on heating time and heating temperature, is preferably 0.1 to 5% by volume, more preferably 0.1 to 2% by volume. The oxygen gas concentration in the above range tends to lead to the formation of a uniform oxycarbonitride. The oxygen gas concentration of less than 0.1% by volume tends to prevent the oxidation. The oxygen gas concentration of more than 5% by volume tends to make the oxidation proceed excessively.

The heating temperature is preferably 600 to 1300° C., more preferably 600 to 1200° C., further preferably 700 to 1100° C. The heating temperature in the above range tends to lead to the formation of a uniform oxycarbonitride. The heating temperature of lower than 600° C. tends to prevent the oxidation from proceeding. The heating temperature of higher than 1200° C. tends to make the oxidation proceed excessively.

The inert gas may contain a hydrogen gas. The concentration of the hydrogen gas, which depends on heating time and heating temperature, is preferably 0.01 to 4% by volume, more preferably 0.1 to 4% by volume. When the inert gas contains the hydrogen gas within the above range, the resultant fuel cell catalyst tends to have high catalytic activity. The hydrogen gas concentration of higher than 4% by volume tends to increase explosion risk.

In the present invention, the gas concentration (% by volume) is a value in terms of standard condition.

Examples of the heating method include a standing method, a stirring method, a dropping method and a powder capturing method.

Under the standing method, the metal carbonitride placed in a stationary electric furnace or the like is heated. In another way of this method, an alumina board, a quartz board or the like on which the metal carbonitride has been weighed is placed and heated. The standing method is preferable in terms of being able to heat a large amount of the metal carbonitride.

Under the stirring method, the metal carbonitride introduced into an electric furnace such as a rotary kiln is heated while being stirred. The stirring method is preferable in terms of being able to heat a large amount of the metal carbonitride, and also in terms of being able to prevent the aggregation and growth of particles of the metal carbonitride.

In the case where the method such as the standing method and the stirring method is carried out using a tubular furnace, the time for heating the metal carbonitride is preferably 0.1 to 20 hours, more preferably 1 to 10 hours. The heating time in the above range tends to lead to the formation of a uniform oxycarbonitride. The heating time of less than 0.1 hour tends to lead to partial formation of an oxycarbonitride. The heating time of more than 20 hours tends to make the oxidation proceed excessively.

Under the dropping method, an induction furnace is heated to a predetermined heating temperature while flowing an inert gas containing a trace amount of an oxygen gas through the furnace; a thermal equilibrium is maintained at the temperature; and the metal carbonitride is dropped and heated in a crucible which is a heating zone in the furnace. The dropping method is preferable in terms of being able to minimizing the aggregation and growth of particles of the metal carbonitride.

In the dropping method, the time for heating the metal carbonitride is usually 0.5 to 10 minutes, preferably 1 to 3 minutes. The heating time within the above range is preferable, leading to the tendency of the formation of a uniform oxycarbonitride. The heating time of less than 0.5 minute tends to lead to partial formation of an oxycarbonitride. The heating time of more than 10 minutes tends to make the oxidation proceed excessively.

Under the powder capturing method, the metal carbonitride is caused to suspend as particles in an inert gas atmosphere containing a trace amount of an oxygen gas, and the metal carbonitride is captured and heated in a vertical tubular furnace controlled at a predetermined heating temperature.

In the powder capturing method, the time for heating the metal carbonitride is 0.2 second to 1 minute, preferably 0.5 to 10 seconds. The heating time within the above range is preferable, leading to the tendency of the formation of a uniform oxycarbonitride. The heating time of less than 0.2 second tends to lead to partial formation of an oxycarbonitride. The heating time of more than 1 minute tends to make the oxidation proceed excessively.

In the fuel cell catalyst layer of the present invention, the metal oxycarbonitride obtained by the above production method may be used as it is, but the resultant metal oxycarbonitride may be disintegrated to provide a finer powder and this finer powder may be used.

An exemplary method for disintegrating the metal oxycarbonitride employs any of a roll-rotating mill, a ball mill, a medium-stirring mill, a gas stream pulverizing machine, a mortar and a disintegrating tank. In particular, preferred is a method employing a planetary ball mill.

The disintegrated metal oxycarbonitride is in the form of finer particles, and thus tends to be suitably dispersed to form the layer (I) that is uniform. The disintegrated metal oxycarbonitride has a larger BET specific surface area than the metal oxycarbonitride that has not been disintegrated, and thus the fuel cell catalyst layer finally obtained tends to have increased catalytic activity.

The BET specific surface area of the metal oxycarbonitride is preferably 1 m²/g or more, more preferably 1 to 1000 m²/g, still more preferably 1 to 350 m²/g, far more preferably 1 to 300 m²/g, much more preferably 5 to 300 m²/g, particularly preferably 5 to 250 m²/g.

The value of the BET specific surface area in the present invention is measurable using a commercially available BET measurement apparatus, with examples thereof including Micromeritics Gemini 2360 manufactured by Shimadzu Corporation.

The metal oxycarbonitride preferably has a primary particle diameter of 5 nm to 1.5 μm, more preferably 6 nm to 1 μm, still more preferably 8 nm to 500 nm.

In the present invention, the primary particle diameter of the metal oxycarbonitride is determined from a BET specific surface on the basis of the following equation (1).

$$d = 6/(p \times S) \quad (1)$$

d: primary particle diameter (μm) of metal oxycarbonitride
p: density (g/cm³) of metal oxycarbonitride
S: BET specific surface area (m²/g) of metal oxycarbonitride A method for obtaining the metal carbonitride is not particularly limited. Exemplary methods include a method (i) in which a mixture of a metal oxide and carbon is heated in a nitrogen atmosphere or in a nitrogen-containing inert gas to produce the metal carbonitride; and a method (ii) in which a mixture of the metal-containing compound (for example, an organic acid salt, a chloride, or a complex), a metal carbide and a metal nitride is heated in an inert gas such as a nitrogen gas to produce the metal carbonitride.

The heating temperature in producing the metal carbonitride is 600 to 1800° C., preferably 800 to 1600° C. The heating temperature being within the above range tends to lead to good crystallinity and uniformity. The heating temperature of lower than 600° C. tends to lead to deteriorated crystallinity and uniformity. The heating temperature of higher than 1800° C. tends to lead to easy sintering.

As the heating method, exemplary methods are the standing method, the stirring method, the dropping method and the powder capturing method as described above.

It is preferred that the metal carbonitride obtained by the above production method is pulverized. A method for pulverizing the metal carbonitride is, for example, a method using any of a roll-rotating mill, a ball mill, a medium-stirring mill, a gas stream pulverizing machine, a mortar and a disintegrating tank. In terms of providing much finer metal carbonitride, the method using a gas stream pulverizing machine is preferable, and in terms of facilitating the treatment in a small amount, the method using a mortar is preferable.

In the fuel cell catalyst layer of the present invention according to a preferable embodiment, at least one layer of the layer (I) and the layer (II) further contains electron conductive particles. Further, in a preferable embodiment, at least one layer of the layer (I) and the layer (II) further contains polymer electrolytes. The electron conductive particles may be contained in the layer (I) and/or the layer (II), but is preferably contained at least in the layer (I). When the fuel cell catalyst layer comprising the catalyst further contains the electron conductive particles, the reduction current can be more increased. It is considered that the electron conductive particles increase the reduction current because of allowing the catalyst to have an electrical bond for inducing electrochemical reaction.

The electron conductive particles can be generally used as a carrier of the metal oxycarbonitride and/or platinum. The electron conductive particles are preferably used as a carrier of platinum in the layer (II).

Examples of materials constituting the electron conductive particles include carbons, conductive polymers, conductive ceramics, metals and conductive inorganic oxides such as tungsten oxide and iridium oxide. These electron conductive materials may be used singly or in combination with two or more kinds. In particular, carbon particles having a large specific surface area, or mixtures of carbon particles having a large specific surface area and other electron conductive particles are preferable.

That is, the fuel cell catalyst layer according to a preferable embodiment comprises carbon particles having a large specific surface area.

Examples of the carbons include carbon blacks, graphites, black leads, activated carbons, carbon nanotubes, carbon nanofibers, carbon nanohorns and fullerenes. If the particle diameter of carbon is too small, the carbon cannot readily form an electron conductive path, and if the particle diameter of carbon is too large, the fuel cell catalyst layer tends to have reduced gas diffusion properties, or the usage rate of the catalyst layer tends to be lowered. Thus, the carbon preferably has a particle diameter of 10 to 1000 nm, more preferably 15 to 100 nm.

When a material constituting the electron conductive particles is carbon and the carbon is contained in the layer (I), the mass ratio of the metal oxycarbonitride to the carbon contained in the layer (I) (metal oxycarbonitride: electron conductive particles) is preferably 4:1 to 1000:1. When a material constituting the electron conductive particles is carbon and the carbon is contained in the layer (II), the mass ratio of the platinum to the carbon contained in the layer (II) (platinum: electron conductive particles) is preferably 4:1 to 1000:1.

The conductive polymers are not particularly limited. Examples thereof include polyacetylene, poly-p-phenylene, polyaniline, polyalkylaniline, polypyrrole, polythiophene, polyindole, poly-1,5-diaminoanthraquinone, polyaminodiphenyl, poly(o-phenylenediamine), poly(quinolinium) salt, polypyridine, polyquinoxaline and polyphenylquinoxaline. Of these, polypyrrole, polyaniline and polythiophene are preferred, and polypyrrole is more preferred.

Polymer electrolytes are not particularly limited as long as being those generally used in fuel cell catalyst layers. Specific examples thereof include perfluorocarbon polymers having a sulfonic acid group (such as NAFION (registered trademark) (5% NAFION (registered trademark) solution (DE521), DuPont)), hydrocarbon polymer compounds having a sulfonic acid group, polymer compounds doped with inorganic acids such as phosphoric acid, organic/inorganic hybrid polymers partially substituted with proton conductive functional groups, and proton conductors composed of a polymer matrix impregnated with a phosphoric acid solution or a sulfuric acid solution. Of these, NAFION (registered trademark) (5% NAFION (registered trademark) solution (DE521), DuPont) is preferable.

The fuel cell catalyst layer of the present invention may be used as an anode catalyst layer or a cathode catalyst layer. The fuel cell catalyst layer of the present invention shows high oxygen reducing ability and contains the metal oxycarbonitride hardly corrosive even at high potential in acidic electrolytes, and therefore is useful as a catalyst layer provided in a cathode of a fuel cell (cathode catalyst layer). In particular, the fuel cell catalyst layer of the present invention is suitable as a catalyst layer provided in a cathode of a membrane electrode assembly of a polymer electrolyte fuel cell. When the catalyst layer of the present invention is used as an oxygen reducing electrode, hydrogen ions generated at the anode and electrons and oxygen supplied from the circuit are reacted with each other to produce water.

The metal oxycarbonitride may be dispersed on the electron conductive particles serving as a carrier by a method such as airborne dispersion methods and in-liquid dispersion methods. The in-liquid dispersion methods are preferable because a dispersion of the metal oxycarbonitride and the electron conductive particles in a solvent can be used in the step of forming the layer (I).

Exemplary in-liquid dispersion methods include an orifice-choked flow method, a rotational shear flow method and an ultrasonic method. Solvents used in the in-liquid dispersion methods are not particularly limited as long as the metal oxycarbonitride or the electron conductive particles are not corroded and are dispersed therein. Volatile liquid organic solvents, water or the like are generally used.

When the metal oxycarbonitride is dispersed on the electron conductive particles, the electrolyte and a dispersing agent may be further dispersed at the same time.

A method for dispersing platinum on the electron conductive particles serving as a carrier is not particularly limited. An exemplary method is such that a solution containing a platinum compound and the electron conductive particles are stirred and mixed, followed by the addition of a reducing agent and further stirring and mixing, so that platinum is dispersed on the electron conductive particles.

As a material for forming the layer (II), a commercially available product in which platinum is supported on electron conductive particles may be used. Examples of this commercially available product include Pt-supporting carbon (TEC10E60E, manufactured by Tanaka Kinzoku Kogyo K.K.) and HiSPEC4000 (manufactured by Johnson Matthey).

A method for forming the fuel cell catalyst layer is not particularly limited. For example, a suspension containing the metal oxycarbonitride, electron conductive particles, an electrolyte, and further optionally containing a binder such as polytetrafluoroethylene, polyvinylidene fluoride, styrene/butadiene copolymer, polyacrylate, NAFION (registered trademark) (copolymer of tetrafluoroethylene and applied on a gas diffusion layer described later to form the layer (I), and thereon, a suspension containing platinum, electron conductive particles and an electrolyte is applied to form the layer (II).

In another method, on an electrolyte membrane described later, a suspension containing platinum, electron conductive particles and an electrolyte is applied to form the layer (II), and thereon, a suspension containing the metal oxycarbonitride, electron conductive particles, an electrolyte, and further optionally containing a binder such as NAFION (registered trademark) to form the layer (I).

The binder is preferably NAFION (registered trademark), which has high hydrogen-ion conductivity.

The applying methods include dipping, screen printing, roll coating, flow coating, doctor blade method, squeegee method and spraying.

<Uses>

The electrode of the present invention is an electrode comprising a fuel cell catalyst layer and a porous support layer, wherein the fuel cell catalyst layer is the fuel cell catalyst layer described above.

Figure 2:
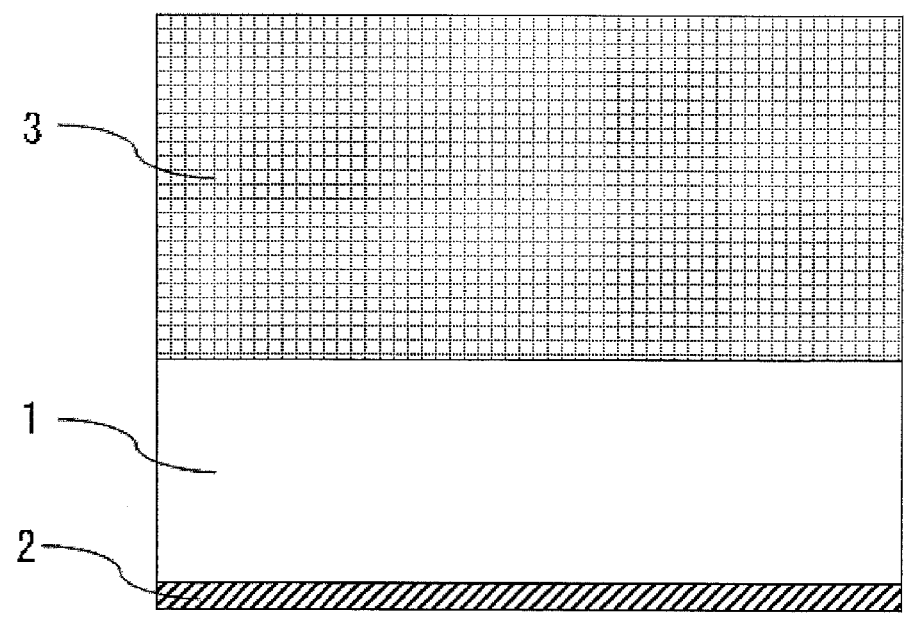
FIG. 2 is an example of a cross-sectional view of an electrode.

The electrode of the present invention preferably has a configuration where on the porous support layer, the metal oxycarbonitride-containing layer (I) and the platinum-containing layer (II) are laminated in this order (for example, see FIG. 2). The electrode with this configuration tends to have excellent durability and considerably superior power generation property.

The electrode of the present invention may be used as a cathode or an anode. The electrode of the present invention, having excellent durability and large power generation property, is suitably used as a cathode, leading to high industrial advantage.

The porous support layer is a layer that diffuses gas (hereinafter, also referred to as the "gas diffusion layer"). The gas diffusion layer is not particularly limited as long as having electron conductivity, high gas diffusion properties and high corrosion resistance. As the gas diffusion layer, carbon-based porous materials such as carbon paper and carbon cloth, and stainless steel and anticorrosive-coated aluminum foils for weight reduction are generally used.

The membrane electrode assembly of the present invention comprises a cathode, an anode and an electrolyte membrane interposed between the cathode and the anode, wherein the cathode and/or the anode is the electrode as described above.

Figure 3:
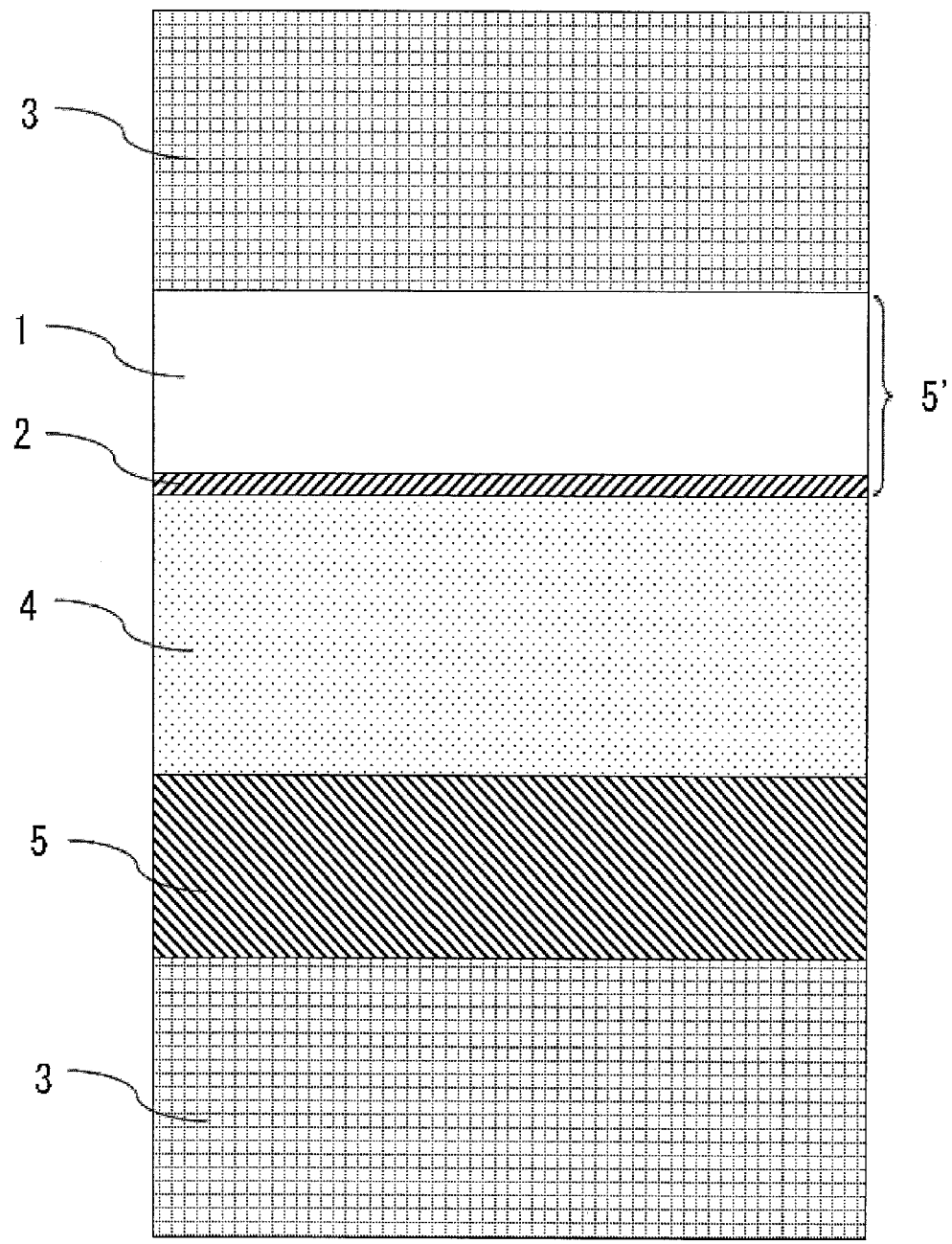
FIG. 3 is an example of a cross-sectional view of a membrane electrode assembly (MEA).

The membrane electrode assembly of the present invention preferably has a configuration where on the electrolyte membrane, the platinum-containing layer (II) and the metal oxycarbonitride-containing layer (I) are laminated in this order (for example, see FIG. 3). The membrane electrode assembly with this configuration tends to have considerably superior power generation property.

The membrane electrode assembly is obtainable by forming the fuel cell catalyst layer on the electrolyte membrane and/or the gas diffusion layer and hot pressing in such a manner that both surfaces of the electrolyte membrane are held by the gas diffusion layer, with the cathode catalyst layer and the anode catalyst layer facing inward.

The temperature in hot pressing, which is appropriately selected depending on a component of an electrolyte membrane and/or the catalyst layer, is preferably 100 to 160° C., more preferably 120 to 160° C., still more preferably 120 to 140° C. If the temperature in hot pressing is lower than the lower limit, assembling may be insufficient. If the temperature in hot pressing is higher than the upper limit, a component of the electrolyte membrane and/or the catalyst layer may be deteriorated.

The pressure in hot pressing, which is appropriately selected depending on a component of an electrolyte membrane and/or the catalyst layer and on the type of a gas diffusion layer, is preferably 10 to 1000 kg/cm$^2$, more preferably 20 to 500 kg/cm$^2$, still more preferably 40 to 250 kg/cm$^2$. If the pressure in hot pressing is less than the lower limit, assembling may be insufficient. If the pressure in hot pressing is more than the upper limit, the porosity of the catalyst layer and the gas diffusion layer may be decreased, which may lead to deteriorated performance.

The hot pressing time, which is appropriately selected depending on the temperature and the pressure in hot pressing, is preferably 1 to 20 minutes, more preferably 3 to 15 minutes, still more preferably 5 to 10 minutes.

The power generation property in the membrane electrode assembly can be evaluated from a maximum power density calculated for example by the following manner.

At first, the membrane electrode assembly is held by sealing materials (gaskets), separators having a gas flow passage and collectors, and fixed with a bolt and secured such that the pressure of contacted surface is a prescribed value (4N), to prepare a single cell of a polymer electrolyte fuel cell. If the cell temperature is significantly low, the temperature is increased to a measurement temperature by using a rubber heater or the like (see FIG. 4).

To the anode side, hydrogen is supplied as a fuel at a flow rate of 100 ml/min, and to the cathode side, oxygen is supplied as an oxidizing agent at a flow rate of 100 ml/min. While applying ordinary pressure to both the anode and cathode sides, a current-voltage property at a single cell temperature of 25° C. is measured. At each measurement point of the current-voltage property obtained, a maximum power density is calculated by integration. The larger the maximum power density is, the higher the power generation property of the membrane electrode assembly is. The maximum power density is preferably not less than 6 mW/cm$^2$, more preferably not less than 10 mW/cm$^2$, still more preferably not less than 20 mW/cm$^2$.

As the electrolyte membranes, for example, a perfluorosulfonic acid electrolyte membrane or a hydrocarbon electrolyte membrane is generally used. A polymer microporous membrane impregnated with a liquid electrolyte, a porous membrane filled with a polymer electrolyte or the like may be used.

The fuel cell of the present invention comprises the membrane electrode assembly as described above.

The electrode reaction in fuel cells takes place at a so-called three-phase interface (electrolyte-electrode catalyst-reaction gas). The fuel cells are classified according to an electrolytes used, into several types such as molten carbonate fuel cells (MCFC), phosphoric acid fuel cells (PAFC), solid oxide fuel cells (SOFC) and polymer electrolyte fuel cells (PEFC). In particular, the membrane electrode assembly of the present invention is preferably used for the polymer electrolyte fuel cells.

EXAMPLES

Hereinafter, the present invention will be more specifically described based on examples hereinbelow without limiting the scope of the present invention.

In Examples, measurements were carried out by the following methods.
[Analytical Methods]
1. Elemental Analysis
<Carbon and Sulfur>
About 0.01 g of a sample was weighed and analyzed with a carbon/sulfur analyzer (EMIA-920V manufactured by HORIBA, Ltd.).
<Nitrogen and Oxygen>
About 0.01 g of a sample was weighed and sealed in a Ni capsule, and this was analyzed with an oxygen/nitrogen analyzer (TC600 manufactured by LECO JAPAN CORPORATION).
<Metal (e.g., Titanium)>
About 0.1 g of a sample was weighed in a quartz beaker, and was completely thermal-decomposed using sulfuric acid, nitric acid and hydrofluoric acid. This solution was cooled and was collected to a volume of 100 mL. This was appropriately diluted and quantitatively analyzed with ICP-OES (VISTA-PRO manufactured by SII) or with ICP-MS (HP7500 manufactured by Agilent).
<Fluorine>
Several mg of a sample was decomposed by combustion while flowing water vapor under oxygen stream. A generated gas was made to be absorbed by 10 mM Na$_2$CO$_3$ (containing hydrogen peroxide; standard for correction Br–: 5 ppm) to measure the amount of fluorine by ion chromatography.

Combustion Decomposition Conditions:
  Sample combustion apparatus: AQF-100 (manufactured by Mitsubishi Chemical Analytech Co., Ltd.)
  Combustion tube temperature: 950° C. (temperature-raising decomposition by moving a sample board)
Ion Chromatography Measurement Conditions:
  Measuring apparatus: DIONEX DX-500
  Eluent: 1.8 mM Na$_2$CO$_3$+1.7 mM NaHCO$_3$
  Column (temperature): ShodexSI-90 (room temperature)
  Flow rate: 1.0 ml/min
  Injection amount: 25 μl
  Detector: Electric conductivity detector
  Suppressor: DIONEX ASRS-300
<Boron>
Several tens of mg of a sample, after phosphoric acid was added and then sulfuric acid was added thereto, was heated until white smoke of sulfuric acid was generated, and was left standing to cool. Then, an operation of addition of nitric acid→ heating → standing to cool was repeated several times. The sample subjected to these operations was quantitatively determined with pure water to 50 ml in a plastic container, followed by diluting the quantitatively determined product (supernatant liquid in the case of generating a precipitate) 10 times with pure water. Then, the amount of boron was measured by ICP emission spectrometry.
<Phosphorus>
About 0.02 g of a sample, after sulfuric acid was added thereto, was heated until white smoke of sulfuric acid was generated, and was left standing to cool, followed by adding nitric acid and repeating an operation of addition of nitric acid→ heating→ standing to cool until complete decomposition thereof. The sample subjected to these operations was quantitatively determined with pure water to 100 ml in a plastic container. If a white turbidity was seen, hydrofluoric acid was added until the white turbidity was not observed. The quantitatively determined product was further diluted 50 times with pure water and the amount of phosphorus was measured by ICP emission spectrometry.
2. BET Specific Surface Area Measurement
  BET specific surface area was measured using Micromeritics Gemini 2360 manufactured by Shimadzu Corporation.
3. Primary Particle Diameter
  The primary particle diameter of the metal oxycarbonitride was determined from a BET specific surface area on the basis of the following equation (1).

$$d=6/(p \times S) \quad (1)$$

d: primary particle diameter (μm) of metal oxycarbonitride
  p: density (g/cm$^3$) of metal oxycarbonitride
  S: BET specific surface area (m$^2$/g) of metal oxycarbonitride Preparation Example 1

1. Preparation of Platinum-Containing Ink
  0.6 g of Pt-supporting carbon (TEC10E60E, manufactured by Tanaka Kinzoku Kogyo K.K.) was added to 50 ml of pure water. Further, 5 g of an aqueous solution (aqueous 5% NAFION solution, manufactured by Wako Pure Chemical Industries, Ltd.) containing NAFION (registered trademark) was added. These were mixed with an ultrasonic wave dispersion machine (UT-106H, manufactured by Sharp Manufacturing Systems Corporation) for 1 hour, to prepare a platinum-containing ink.
2. Formation of Platinum-Containing Layer
  A gas diffusion layer (carbon paper TGP-H-060, manufactured by TORAY INDUSTRIES INC.) was immersed in acetone for 30 seconds and degreased, and dried. Then, the gas diffusion layer was immersed in an aqueous 10% polytetrafluoroethylene (hereinafter also referred to as "PTFE") solution for 30 seconds. The gas diffusion layer was dried at room temperature, and was heated at 350° C. for 1 hour, to provide a water-repellent gas diffusion layer having PTFE dispersed in the carbon paper (hereinafter also referred to as "GDL").

The above GDL was formed into the size of 5 cm×5 cm, and the surface thereof was coated with the platinum-containing ink prepared in the above item 1 by using an automatic spray-coating apparatus (manufactured by SAN-EI TECH Ltd.) at 80° C. By repeating the spray-coating, a platinum-containing layer (a) was formed on GDL such that the mass per unit area of platinum was 1 mg/cm$^2$. In this way, on the GDL, the platinum-containing layer (a) was formed. This was defined as an electrode (A).

Example 1

1. Preparation of Metal Oxycarbonitride 5.10 g (85 mmol) of titanium carbide (TiC), 0.80 g (10 mmol) of titanium oxide (TiO$_2$) and 0.31 g (5 mmol) of titanium nitride (TiN) were sufficiently mixed with one another. This mixture was heated at 1800° C. for 3 hours in a nitrogen atmosphere, to provide 5.73 g of titanium carbonitride. This titanium carbonitride, which was a sintered product, was pulverized with an automatic mortar.

While flowing a nitrogen gas containing 1% by volume of an oxygen gas and 4% by volume of a hydrogen gas, 298 mg of the pulverized titanium carbonitride was heated in a tubular furnace at 1000° C. for 6 hours, to provide 380 mg of a titanium-containing oxycarbonitride (hereinafter also referred to as the "metal oxycarbonitride (1)"). The result of elemental analysis of the metal oxycarbonitride (1) is shown in Table 1.

The metal oxycarbonitride (1) had a BET specific surface area of 10 m$^2$/g and a primary particle diameter of 150 nm.

2. Preparation of Metal Oxycarbonitride-Containing Ink 0.24 g of the metal oxycarbonitride (1) prepared in the above item 1 and 0.12 g of carbon black as electron conductive particles (ketjen black EC600JD, manufactured by LION Corporation) were added to 50 ml of 2-propanol (manufactured by Wako Pure Chemical Industries, Ltd.). Further, 2.8 g of an aqueous solution (aqueous 5% NAFION solution, manufactured by Wako Pure Chemical Industries, Ltd.) containing NAFION (registered trade name) was added. These were mixed with an ultrasonic wave dispersion machine (UT-106H, manufactured by Sharp Manufacturing Systems Corporation) for 1 hour, to prepare metal oxycarbonitride-containing ink (1).

3. Preparation of Platinum-Containing Ink 1.2 g of Pt-supporting carbon (TEC10E60E, manufactured by Tanaka Kinzoku Kogyo K.K.) was added to 2.4 g of pure water and 2.4 g of isopropyl alcohol (special grade, manufactured by Wako Pure Chemical Industries, Ltd.). Further, 13 g of an aqueous solution (aqueous 5% NAFION solution, manufactured by Wako Pure Chemical Industries, Ltd.) containing NAFION (registered trade name) was added. These were mixed with an ultrasonic wave dispersion machine (UT-106H, manufactured by Sharp Manufacturing Systems Corporation) for 1 hour, to prepare a platinum-containing ink (2).

4. Preparation of Fuel Cell Catalyst Layer

A gas diffusion layer (carbon paper TGP-H-060, manufactured by TORAY INDUSTRIES INC.) was immersed in acetone for 30 seconds and degreased, and dried. Then, the gas diffusion layer was immersed in an aqueous 10% polytetrafluoroethylene (hereinafter also referred to as "PTFE") solution for 30 seconds.

The gas diffusion layer was dried at room temperature, and was heated at 350° C. for 1 hour, to provide a water-repellent gas diffusion layer having PTFE dispersed in the carbon paper (hereinafter also referred to as "GDL").

Then, the above GDL was formed into the size of 5 cm×5 cm, and the surface thereof was coated with the metal carbonitride-containing ink (1) prepared in the above item 2 by using an automatic spray-coating apparatus (manufactured by SAN-EI TECH Ltd.) at 80° C. By repeating the spray-coating, a metal oxycarbonitride-containing layer (I) was formed on the GDL such that the mass per unit area of the metal oxycarbonitride was 5 mg/cm$^2$.

Then, the surface of the layer (I) was coated with the platinum-containing ink (2) prepared in the above item 3 by using an automatic spray-coating apparatus (manufactured by SAN-EI TECH Ltd.) at 80° C. By repeating the spray-coating, a platinum-containing layer (II) was formed on the layer (I) such that the mass per unit area of platinum was 0.1 mg/cm$^2$.

In this way, on the gas diffusion layer (GDL), a fuel cell catalyst layer (1) in which the metal oxycarbonitride-containing layer (I) and the platinum-containing layer (II) were laminated in this order was formed. This was defined as an electrode (B) (see FIG. 2).

5. Preparation of Membrane Electrode Assembly (Hereinafter Also Referred to as "MEA")

As an electrolyte membrane, a NAFION membrane N-115 (manufactured by DuPont) was used. As an anode, the electrode (A) prepared in Preparation Example 1 was used. As a cathode, the electrode (B) prepared in the above item 4 was used.

MEA (1) wherein the electrolyte membrane was interposed between the cathode and the anode was prepared in the following manner.

At first, the electrolyte membrane was heated in a 3% hydrogen peroxide solution at 80° C. for 1 hour, and then heated in pure water at 80° C. for 1 hour. Then, the electrolyte membrane was heated in a 1 M aqueous sulfuric acid solution at 80° C. for 1 hour, and then heated in pure water at 80° C. for 1 hour.

The electrolyte membrane from which moisture was thus removed was held between the cathode and the anode, and thermally compressed by using a hot pressing machine at 130° C. at 100 kg/cm$^2$ for 1 minute, to prepare MEA (1) (See FIG. 3). The electrolyte membrane was held by the cathode and the anode so that the fuel cell catalyst layer (1) in the cathode and the platinum-containing layer (a) in the anode adhered to the electrolyte membrane.

6. Preparation of Single Cell

Figure 4:
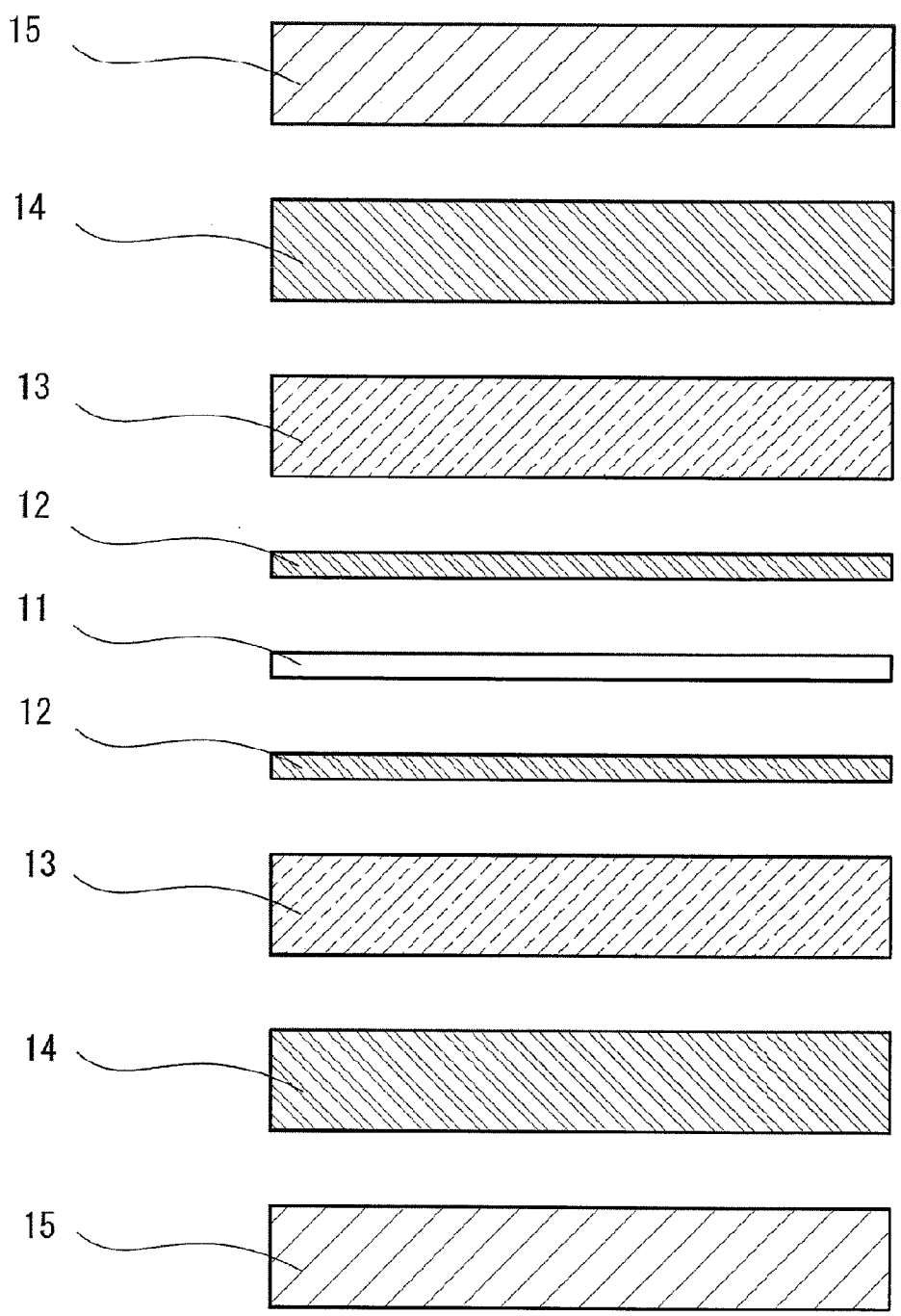
FIG. 4 is an example of a cross-sectional view of a dismantled single cell of a polymer electrolyte fuel cell.
Figure 5:
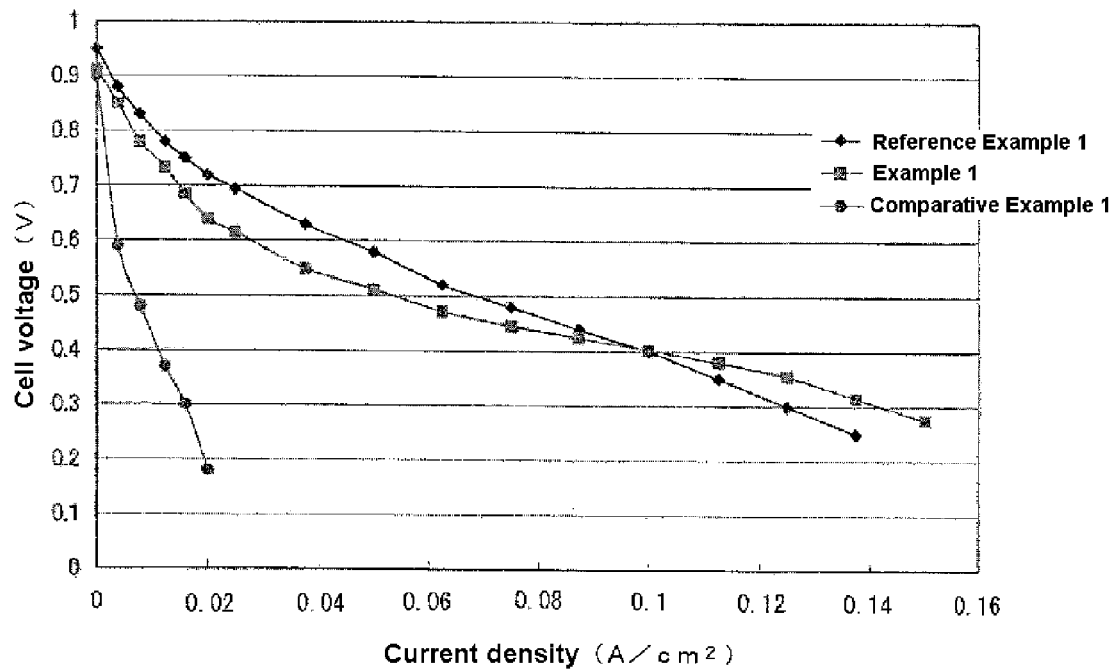
FIG. 5 shows current-voltage property curves of single cells each prepared in Example 1 and Reference Example 1 and Comparative Example 1.
Figure 6:
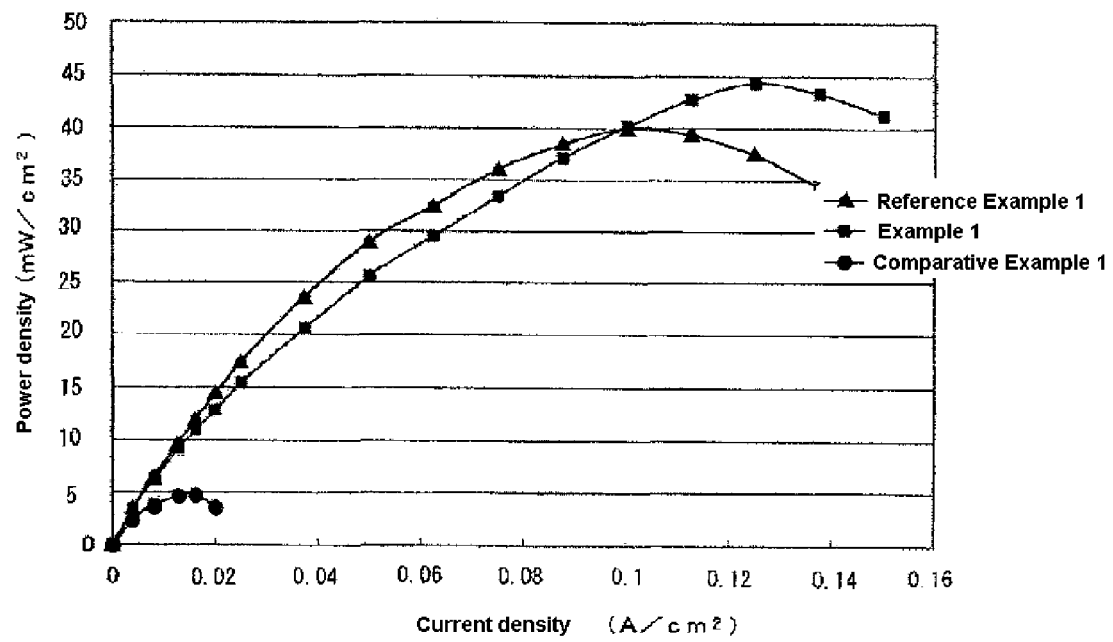
FIG. 6 shows current-power density curves of single cells each prepared in Example 1 and Reference Example 1 and Comparative Example 1.

As shown in FIG. 4, MEA (1) prepared in the above item 5 was held by two sealing materials (gaskets), two separators having a gas flow passage, two collectors and two rubber heaters, and fixed with a bolt and secured such that the pressure of contacted surface was a prescribed value (4N), to prepare a single cell (1) (25 cm$^2$) of a polymer electrolyte fuel cell.

7. Evaluation of Power Generation Property

The single cell (1) prepared in the above item 6 was kept at 25° C. To the anode side, hydrogen was supplied as a fuel at a flow rate of 100 ml/min, and to the cathode side, oxygen was supplied as an oxidizing agent at a flow rate of 100 ml/min. While applying ordinary pressure to both the anode and cathode sides, a current-voltage property of the single cell (1) (temperature: 25° C.) was measured. From the current-voltage property curve obtained, a maximum power density was calculated. The higher the maximum power density is, the higher the power generation property of MEA is and the higher the catalytic performance of the fuel cell catalyst layer constituting MEA is. MEA (1) had a power generation property, i.e., maximum power density, of 45 mW/cm$^2$.

Example 2

1. Preparation of Metal Oxycarbonitride 9.37 g of titanium tetraisopropoxide (manufactured by Junsei Chemical Co., Ltd.) and 5.12 g of acetylacetone (Junsei Chemical Co., Ltd.) were added to a solution of 15 mL of ethanol (manufactured by Wako Pure Chemical Industries, Ltd.) and 5 mL of acetic acid (manufactured by Wako Pure Chemical Industries, Ltd.), and these were stirred at room temperature, to prepare a titanium-containing mixture solution. Meanwhile, 10 g of glycine (manufactured by Wako Pure Chemical Industries, Ltd.) and 0.582 g of iron acetate (manufactured by Aldrich) were added to 20 mL of pure water, and these were stirred at room temperature and fully dissolved, to prepare a glycine-containing mixture solution.

The titanium-containing mixture solution was slowly added to the glycine-containing mixture solution, to obtain a transparent catalyst precursor solution. By using a rotary evaporator, under reduced pressure in a nitrogen atmosphere, with the temperature of a hot stirrer set at about 100° C., the catalyst precursor solution was heated and stirred to slowly evaporate the solvent. The solvent was fully evaporated, and the resultant solid residue was finely and uniformly crushed with a mortar, to obtain a powder.

This powder was introduced to a tubular furnace, and under a mixed gas atmosphere of hydrogen at 4% by volume and nitrogen, was heated to 900° C. at a heating rate of 10° C./min and held at 900° C. for 1 hour, and was allowed to cool, to obtain a powder (hereinafter also referred to as the "metal oxycarbonitride (2)" or "heat-treated product (2)").

The result of elemental analysis of the metal oxycarbonitride (2) is shown in Table 4. The presence of carbon, nitrogen and oxygen was confirmed.

The metal oxycarbonitride (2) had a BET specific surface area of 230 m$^2$/g.

2. Preparation of Metal Oxycarbonitride-Containing Ink

By the same method as in Example 1 except that the metal oxycarbonitride (2) prepared in the above item 1 was used, an ink (2) was prepared.

3. Preparation of Platinum-Containing Ink

By the same method as in Example 1, a platinum-containing ink (2) was prepared.

4. Formation of Fuel Cell Catalyst Layer

By the same method as in Example 1 except that the metal oxycarbonitride-containing ink (2) was used, a fuel cell catalyst layer (2) was formed. An electrode (B) using the fuel cell catalyst layer (2) was provided.

5. Preparation of Membrane Electrode Assembly (Hereinafter Also Referred to as "MEA")

By the same method as in Example 1 except that the fuel cell catalyst layer (2) was used, MEA (2) in which an electrolyte membrane was disposed was prepared.

6. Preparation of Single Cell

By the same method as in Example 1 except that MEA (2) was used, a single cell (2) (25 cm$^2$) of a polymer electrolyte fuel cell was prepared.

7. Evaluation of Power Generation Property

By the same method as in Example 1 except that the single cell (2) prepared in the above item 6 was used, the power generation property was evaluated. MEA (2) had a catalytic performance, i.e., maximum power density, of 50 mW/cm$^2$.

The experiment conditions and results of Example 2 are indicated in Tables 3 and 4.

Example 3

1. Preparation of Metal Oxycarbonitride

To a beaker, 2.60 g (25.94 mmol) of acetylacetone was introduced, and while this was stirred, 5 ml (17.59 mmol) of titanium tetraisopropoxide was added, and 8 ml (140.00 mmol) of acetic acid was dropwise added over 2 minutes, to prepare a titanium solution.

To a beaker, 60 ml of water, 50 ml of ethanol and 60 ml of acetic acid were introduced. Hereto, 8.74 g (70.36 mmol) of pyrazinecarboxylic acid was added and completely dissolved. To the resultant solution, while this was stirred, 10 ml of a 5% NAFION (registered trademark) solution (DE521, DePont) was added, and further 291 mg (1.67 mmol) of iron acetate was little by little added and dissolved. Then, with the temperature kept at a room temperature and stirring, the titanium solution was dropwise added for 10 minutes. The dropwise addition was followed by stirring for 30 minutes, to obtain a catalyst precursor solution (3).

By using a rotary evaporator, under reduced pressure in a nitrogen atmosphere, with the temperature of a hot stirrer set at about 100° C., the catalyst precursor solution (3) was heated and stirred to slowly evaporate the solvent. The solvent was fully evaporated, and the resultant solid residue was crushed with an automatic mortar, to obtain 11.7 g of a powder for calcining (3).

While flowing, into a rotary kiln furnace, a nitrogen gas containing 4% by volume of hydrogen gas (i.e., a mixed gas of hydrogen gas:nitrogen gas=4 vol %:96 vol %) at a rate of 20 ml/min, 12 g of the powder for calcining (3) obtained in the same manner was heated to 890° C. at a heating rate of 10° C./min and calcined at 890° C. for 0.5 hour, and was allowed to cool, to obtain 2.08 g of a powdery metal oxycarbonitride (3).

By the same method as in Example 1 except that the metal oxycarbonitride (3) prepared in the above item 2 was used, the power generation property was evaluated. MEA (3) had a catalytic performance, i.e., maximum power density, of 52 mW/cm$^2$.

The experiment conditions and results of Example 3 are indicated in Tables 3 and 4.

Examples 4 to 7

By the same operation as in Example 2 except that the first metal-containing compound, the nitrogen-containing organic compound and the second metal-containing compound were compounds described in Table 3 used at a mass described in Table 3, a metal oxycarbonitride was produced, and then was analyzed. Further, by the same method as in Example 1, the power generation property was evaluated.

The experiment conditions and results of Examples 4 to 7 are indicated in Tables 3 and 4.

Examples 8 to 10

By the same operation as in Example 3 except that the first metal-containing compound, the nitrogen-containing organic compound, the second metal-containing compound, the third metal-containing compound and the compound containing an element selected from boron, phosphorus and sulfur and containing fluorine were compounds described in Table 3 used at a mass described in Table 3, a metal oxycarbonitride was produced, and then was analyzed. Further, by the same method as in Example 1, the power generation property was evaluated.

The experiment conditions and results of Examples 8 to 10 are indicated in Tables 3 and 4.

Example 11

To a beaker, 50 ml of methanol was introduced. While this was stirred, 2.75 g (20.45 mmol) of copper dichloride, 10 ml of a 5% NAFION (registered trademark) solution (DE521, DePont) and 355 mg (2.045 mmol) of iron(II) acetate were added sequentially. To the resultant solution, 10.15 g (81.80 mmol) of pyrazinecarboxylic acid was added little by little, followed by stirring for 3 hours, to obtain a catalyst precursor solution (11).

By using a rotary evaporator, under reduced pressure in a nitrogen atmosphere, with the temperature of a hot stirrer set at about 100° C., the catalyst precursor solution (11) was heated and stirred to slowly evaporate the solvent, followed by heating under nitrogen stream at 300° C. for 1 hour. After chloride residues or the like were removed, 3.56 g of a powder for calcining (11) was obtained.

While flowing, into a rotary kiln furnace, a nitrogen gas containing 4% by volume of hydrogen gas (i.e., a mixed gas of hydrogen gas:nitrogen gas=4 vol %:96 vol %) at a rate of 20 ml/min, 12 g of the powder for calcining (11) obtained in the same manner was heated to 890° C. at a heating rate of 10° C./min and calcined at 890° C. for 0.5 hour, and was allowed to cool, to obtain 5.62 g of a powdery metal oxycarbonitride (11). By the same method as in Example 2 except that the metal oxycarbonitride (11) prepared in the above item 1 was used, the power generation property was evaluated. MEA (11) had a catalytic performance, i.e., maximum power density, of 59 mW/cm$^2$.

The experiment conditions and results of Example 11 are indicated in Tables 3 and 4.

Examples 12 to 15

By the same operation as in Example 3 except that the first metal-containing compound, the nitrogen-containing organic compound, the second metal-containing compound and the compound containing an element selected from boron, phosphorus and sulfur and containing fluorine were compounds described in Table 3 used at a mass described in Table 3, a metal oxycarbonitride was produced, and then was analyzed. Further, by the same method as in Example 1, the power generation property was evaluated.

The experiment conditions and results of Examples 12 to 15 are indicated in Tables 3 and 4.

Example 16

To a beaker, 58 ml of acetic acid was added. While this was stirred, 6.14 g (17.54 mmol) of chromium(III) acetylacetonate was added, to prepare a chromium solution (16).

By the same operation as in Example 3 except that titanium solution (3) was replaced with the chromium solution (16), 14.7 g of a powdery metal oxycarbonitride precursor (16) was obtained. While flowing, into a rotary kiln furnace, a nitrogen gas containing 4% by volume of hydrogen gas (i.e., a mixed gas of hydrogen gas:nitrogen gas=4 vol %:96 vol %) at a rate of 20 ml/min, 12 g of the metal oxycarbonitride precursor (16) obtained in the same manner was heated to 890° C. at a heating rate of 10° C./min and calcined at 890° C. for 0.5 hour, and was allowed to cool, to obtain 2.57 g of a powdery metal oxycarbonitride (16).

By the same method as in Example 2 except that the metal oxycarbonitride (16) prepared in the above item 1 was used, the power generation property was evaluated.

The experiment conditions and results of Example 16 are indicated in Tables 3 and 4.

Examples 17 to 20

By the same operation as in Example 16 except that the first metal-containing compound, the nitrogen-containing organic compound, the second metal-containing compound and the compound containing an element selected from boron, phosphorus, sulfur and containing fluorine were compounds described in Table 3 used at a mass described in Table 3, a metal oxycarbonitride was produced, and then analyzed. Further, by the same method as in Example 1, the power generation property was evaluated.

The experiment conditions and results of Examples 17 to 20 are indicated in Tables 3 and 4.

Reference Example 1

1. Preparation of MEA

By the same method as in Example 1, item 5 except that as a cathode, the electrode (A) prepared in Preparation Example 1 was used, MEA (2) was prepared.

The electrolyte membrane was held by the cathode and the anode so that the platinum-containing layers (a) in the cathode and in the anode adhered to the electrolyte membrane.

2. Preparation of Single Cell

By the same method as in Example 1, item 6 except that MEA (1) was replaced with MEA (2), a single cell (2) of a polymer electrolyte fuel cell was prepared.

3. Evaluation of Power Generation Property

By the same method as in Example 1, item 7 except that the single cell (1) was replaced with the single cell (2), a current-voltage property of the single cell (2) was measured and a maximum power density of the single cell (2) was calculated. MEA (2) had a power generation property, i.e., a maximum power density, of 40 mW/cm$^2$.

Comparative Example 1

1. Preparation of Platinum-Containing Ink 1.2 g of Pt-supporting carbon (TEC10E60E, manufactured by Tanaka Kinzoku Kogyo K.K.) was added to 2.4 g of pure water and 2.4 g of isopropyl alcohol (special grade, manufactured by Wako Pure Chemical Industries, Ltd.). Further, 13 g of an aqueous solution (aqueous 5% NAFION solution, manufactured by Wako Pure Chemical Industries, Ltd.) containing NAFION (registered trade name) was added. These were mixed with an ultrasonic wave dispersion machine (UT-106H, manufactured by Sharp Manufacturing Systems Corporation) for 1 hour, to prepare a platinum-containing ink (3).

2. Formation of Platinum-Containing Layer

A gas diffusion layer (carbon paper TGP-H-060, manufactured by TORAY INDUSTRIES INC.) was immersed in acetone for 30 seconds and degreased, and dried. Then, the gas diffusion layer was immersed in an aqueous 10% polytetrafluoroethylene (hereinafter also referred to as "PTFE") solution for 30 seconds. The gas diffusion layer was dried at room temperature, and was heated at 350° C. for 1 hour, to provide a water-repellent gas diffusion layer having PTFE dispersed in the carbon paper (hereinafter also referred to as "GDL").

The above GDL was formed into the size of 5 cm×5 cm, and the surface thereof was coated with the platinum-containing ink (3) prepared in the above item 1 by using an automatic spray-coating apparatus (manufactured by SAN-EI TECH Ltd.) at 80° C. By repeating the spray-coating, a platinum-containing layer (c) was formed on the GDL such that the mass per unit area of platinum was 0.1 mg/cm$^2$.

In this way, on the GDL, the platinum-containing layer (c) was formed. This was defined as an electrode (C).

3. Preparation of MEA

By the same method as in Example 1, item 5 except that the electrode (C) prepared in the above item 2 was used, MEA (3) was prepared.

The electrolyte membrane was held by the cathode and the anode so that the platinum-containing layer (a) in the anode and the platinum-containing layer (c) in the cathode adhered to the electrolyte membrane.

4. Preparation of Single Cell

By the same method as in Example 1, item 6 except that MEA (1) was replaced with MEA (3), a single cell (3) of a polymer electrolyte fuel cell was prepared.

5. Evaluation of Power Generation Property

By the same method as in Example 1, item 7 except that the single cell (1) was replaced with the single cell (3), a current-voltage property of the single cell (3) was measured and a maximum power density of the single cell (3) was calculated. MEA (3) had a power generation property, i.e., a maximum power density, of 5 mW/cm$^2$.

Comparative Example 2

By the same method as in Comparative Example 1 except that the Pt-supporting carbon was replaced with the metal oxycarbonitride (1) used in Example 1, a current-voltage property of the single cell was measured and a maximum power density of the single cell was calculated. MEA had a power generation property, i.e., maximum power density, of 1 mW/cm$^2$.

Comparative Example 3

By the same method as in Comparative Example 1 except that the Pt-supporting carbon was replaced with the metal oxycarbonitride (2) used in Example 2, a current-voltage property of the single cell was measured and a maximum power density of the single cell was calculated. MEA had a power generation property, i.e., maximum power density, of 2 mW/cm$^2$.

Comparative Example 4

By the same method as in Comparative Example 1 except that the Pt-supporting carbon was replaced with the metal oxycarbonitride (3) used in Example 3, a current-voltage property of the single cell was measured and a maximum power density of the single cell was calculated. MEA had a power generation property, i.e., maximum power density, of 3 mW/cm$^2$.

TABLE 1

Result of elemental analysis of metal-containing oxycarbonitride (atomic number ratio of each component)

| | Ti | C | N | O | Compositional formula |
|---|---|---|---|---|---|
| Metal-containing oxycarbonitride (1) | 1 | 0.15 | 0.07 | 1.7 | TiC$_{0.15}$N$_{0.07}$O$_{1.7}$ |

TABLE 2

Maximum power density

| | Configuration of cathode catalyst layer | Maximum power density (mW/cm$^2$) |
|---|---|---|
| Example 1 | Layer (I) containing metal-containing oxycarbonitride (Mass per unit area of metal-containing oxycarbonitride: 5 mg/cm$^2$) Layer (II) containing platinum (Mass per unit area of platinum: 0.1 mg/cm$^2$) | 45 |
| Reference Example 1 | Layer containing platinum (Mass per unit area of platinum: 1 mg/cm$^2$) | 40 |
| Comparative Example 1 | Layer containing platinum (Mass per unit area of platinum: 0.1 mg/cm$^2$) | 5 |

From the results of Reference Example 1 and Comparative Example 1, it was found that by using less amount of platinum, the fuel cell catalyst layer had a lower catalytic performance, and MEA had a lower power generation property.

On the other hand, the fuel cell catalyst layer obtained in Example 1 uses less amount of platinum, but has the metal oxycarbonitride-containing layer (I), and is thus found to be excellent in catalytic performance, and MEA having this fuel cell catalyst layer is found to be excellent in power generation property.

TABLE 3

| Example | First metal element (M1)-containing compound | AcAc Amount | Nitrogen-containing organic compound Mass (g) | | Second metal element (M2)-containing compound Mass (g) | | Third metal element (M3)-containing compound Mass (g) | Compound containing element A and fluorine Amount |
|---|---|---|---|---|---|---|---|---|
| 2 | Ti-iP | 9.37 g | 5.12 | glycine 10 | iron(II) acetate | 0.582 | | |
| 3 | Ti-iP | 5 ml | 2.6 | pyrazinecarboxylic acid 8.74 | iron(II) acetate | 0.291 | | 5% Nafion 10 ml |
| 4 | Ti-iP | 9.37 g | 5.12 | glycine 10 | ammonium hexacyanoferrate(II) | 0.951 | | |
| 5 | Zr-B | 6.55 g | 2.6 | pyrazinecarboxylic acid 8.74 | iron(II) acetate | 0.291 | | |
| 6 | Ta-E | 4.69 g | 2.6 | pyrazinecarboxylic acid 6.11 | iron(II) acetate | 0.203 | | |

TABLE 3-continued

| Example | First metal element (M1)-containing compound | Amount | AcAc Mass (g) | Nitrogen-containing organic compound | Second metal element (M2)-containing compound Mass (g) | Third metal element (M3)-containing compound | Mass (g) | Compound containing element A and fluorine | Amount |
|---|---|---|---|---|---|---|---|---|---|
| 7 | Nb-E | 10 g | 5.58 | glycine 9.23 | iron(II) acetate 0.534 | | | | |
| 8 | Ti-iP | 5 ml | 2.6 | pyrazinecarboxylic acid 8.74 | iron(II) acetate 0.291 | Zr-B | 0.794 | 5% Nafion | 10 ml |
| 9 | Nb-E | 5.6 g | 2.6 | pyrazinecarboxylic acid 8.74 | iron(II) acetate 0.291 | | | tetraethylammonium tetrafluoroborate | 0.191 g |
| 10 | Ti-iP | 5 ml | 2.6 | pyrazinecarboxylic acid 8.74 | iron(II) acetate 0.291 | | | ammonium tetrafluorophosphate | 0.287 g |
| 11 | CuCl2 | 2.75 g | | pyrazinecarboxylic acid 10.15 | iron(II) acetate 0.355 | | | 5% Nafion | 10 ml |
| 12 | CuCl2 | 2.75 g | | pyrazinecarboxylic acid 10.15 | iron(II) acetate 0.355 | | | | |
| 13 | SnCl4 | 5.33 g | | pyrazinecarboxylic acid 10.15 | iron(II) acetate 0.355 | | | 5% Nafion | 10 ml |
| 14 | CeCl3 | 5.05 g | | pyrazinecarboxylic acid 10.15 | iron(II) acetate 0.355 | | | 5% Nafion | 12.5 ml |
| 15 | AlCl3 | 3.45 g | | pyrazinecarboxylic acid 10.15 | iron(II) acetate 0.357 | | | 5% Nafion | 12.5 ml |
| 16 | CrAcAc | 6.14 g | | pyrazinecarboxylic acid 8.74 | iron(II) acetate 0.291 | | | 5% Nafion | 10 ml |
| 17 | CoAcAc | 5.16 g | | pyrazinecarboxylic acid 8.74 | iron(II) acetate 0.291 | | | 5% Nafion | 10 ml |
| 18 | MnAcAc | 6.2 g | | pyrazinecarboxylic acid 8.74 | iron(II) acetate 0.291 | | | 5% Nafion | 10 ml |
| 19 | SrAcAc | 5.03 g | | pyrazinecarboxylic acid 8.74 | iron(II) acetate 0.291 | | | 5% Nafion | 10 ml |
| 20 | FeAcAc | 6.21 g | | pyrazinecarboxylic acid 8.74 | | | | 5% Nafion | 10 ml |

AcAc: acetylacetone
Ti-iP: titanium tetraisopropoxide
Zr-B: zirconium tetrabutoxide
Ta-E: tantalum pentaethoxide
Nb-E: niobium pentaethoxide
CrAcAc: chromium(III) acetylacetonate
CoAcAc: cobalt(II) acetylacetonate
MnAcAc: manganese (III) acetylacetonate
SrAcAc: strontium bisacetylacetonate
FeAcAc: iron(III) acetylacetonate

TABLE 4

| | Metal oxycarbonitride | | | | | | | | | | | Maximum power density |
|---|---|---|---|---|---|---|---|---|---|---|---|---|
| | BET specific surface area | Composition (molar ratio of constituent element) | | | | | | | | | | |
| Example | $m^2/g$ | M1 | M2 | M3 | C | N | O | S | B | P | F | $mW/cm^2$ |
| 2 | 230 | 0.91 | 0.09 | | 2.30 | 0.08 | 1.42 | | | | | 50 |
| 3 | 296.6 | 0.90 | 0.10 | | 2.98 | 0.39 | 1.46 | 0.027 | | | 0.005 | 52 |
| 4 | 223 | 0.91 | 0.09 | | 2.20 | 0.08 | 1.40 | | | | | 51 |
| 5 | 163 | 0.91 | 0.09 | | 4.70 | 0.09 | 1.70 | | | | | 48 |
| 6 | 12.5 | 0.91 | 0.09 | | 2.40 | 0.31 | 1.90 | | | | | 45 |
| 7 | 195 | 0.90 | 0.10 | | 2.70 | 0.43 | 2.00 | | | | | 50 |
| 8 | 256.1 | 0.85 | 0.08 | 0.07 | 2.87 | 0.35 | 1.31 | 0.008 | | | 0.003 | 52 |
| 9 | 208.8 | 0.90 | 0.10 | | 2.91 | 0.50 | 2.52 | | 0.036 | | 0.001 | 54 |
| 10 | 240.9 | 0.91 | 0.09 | | 2.15 | 0.28 | 1.91 | | | 0.091 | 0.006 | 53 |
| 11 | 213.0 | 0.94 | 0.06 | | 2.01 | 0.19 | 0.37 | 0.0019 | | | 0.0038 | 59 |
| 12 | 140.5 | 0.94 | 0.06 | | 1.86 | 0.20 | 0.59 | | | | | 50 |
| 13 | 133.3 | 0.91 | 0.09 | | 1.80 | 0.17 | 0.35 | 0.0036 | | | 0.0002 | 50 |
| 14 | 91.6 | 0.94 | 0.06 | | 3.32 | 0.30 | 0.92 | 0.0075 | | | 0.0038 | 50 |
| 15 | 401.3 | 0.94 | 0.06 | | 1.79 | 0.10 | 0.46 | 0.0036 | | | 0.1160 | 50 |
| 16 | 304.1 | 0.93 | 0.07 | | 6.64 | 1.04 | 1.66 | 0.0139 | | | 0.0019 | 50 |
| 17 | 146.4 | 0.97 | 0.03 | | 3.01 | 0.06 | 0.28 | 0.0087 | | | 0.0006 | 52 |
| 18 | 151.1 | 0.92 | 0.08 | | 3.83 | 0.14 | 0.94 | 0.0119 | | | 0.6982 | 49 |
| 19 | 83.6 | 0.88 | 0.12 | | 3.33 | 0.07 | 1.30 | 0.0133 | | | 0.8416 | 49 |
| 20 | 183.5 | 1.00 | | | 5.52 | 0.22 | 0.76 | 0.0150 | | | 0.0040 | 53 |

REFERENCE SIGNS LIST

1: metal oxycarbonitride-containing layer (I)
2: platinum-containing layer (II)
3: gas diffusion layer (GDL)
4: electrolyte membrane
5: anode catalyst layer
5': cathode catalyst layer
11: membrane electrode assembly (MEA)
12: gasket
13: separator
14: collector
15: rubber heater

The invention claimed is:

1. A fuel cell catalyst layer comprising a laminate of a metal oxycarbonitride-containing layer (I) and a platinum-containing layer (II), wherein said platinum-containing layer (II) is formed on said metal oxycarbonitride-containing layer (I), and the mass ratio per unit area of the metal oxycarbonitride in the layer (I) to platinum in the layer (II) (metal oxycarbonitride/platinum) is 2 to 500.

2. The fuel cell catalyst layer according to claim 1, wherein the mass per unit area of platinum in the layer (II) is 0.005 to 0.2 mg/cm$^2$.

3. The fuel cell catalyst layer according to claim 1, wherein a metal element constituting the metal oxycarbonitride in the layer (I) is at least one metal element selected from the group consisting of aluminum, chromium, manganese, cobalt, nickel, copper, strontium, yttrium, tin, tungsten, cerium, titanium, niobium, tantalum, zirconium, vanadium, hafnium, iron, lanthanum, cerium and samarium.

4. The fuel cell catalyst layer according to claim 1, wherein a metal element constituting the metal oxycarbonitride in the layer (I) is at least one metal element selected from the group consisting of titanium, niobium, tantalum, zirconium, vanadium, hafnium, iron, lanthanum, cerium and samarium.

5. The fuel cell catalyst layer according to claim 1, wherein a metal element constituting the metal oxycarbonitride in the layer (I) is at least one metal element selected from the group consisting of titanium, niobium, tantalum, zirconium, iron, lanthanum, cerium and samarium.

6. The fuel cell catalyst layer according to claim 1, wherein a metal element constituting the metal oxycarbonitride in the layer (I) is at least one metal element selected from the group consisting of titanium and niobium.

7. The fuel cell catalyst layer according to claim 1, wherein the metal oxycarbonitride in the layer (I) is a metal oxycarbonitride containing fluorine.

8. The fuel cell catalyst layer according to claim 1, wherein the metal oxycarbonitride in the layer (I) is a metal oxycarbonitride containing at least one element A selected from the group consisting of boron, phosphorus and sulfur, and containing fluorine.

9. The fuel cell catalyst layer according to claim 1, wherein at least one layer of the layer (I) and the layer (II) further comprises electron conductive particles.

10. The fuel cell catalyst layer according to claim 9, wherein the electron conductive particles are used as a carrier of platinum in the layer (II).

11. An electrode comprising a fuel cell catalyst layer and a porous support layer, wherein the fuel cell catalyst layer is the fuel cell catalyst layer according to claim 1.

12. The electrode according to claim 11, wherein on the porous support layer, the metal oxycarbonitride-containing layer (I) and the platinum-containing layer (II) are laminated in this order.

13. A membrane electrode assembly comprising a cathode, an anode, and an electrolyte membrane interposed between the cathode and the anode, wherein the cathode and/or the anode is the electrode according to claim 11.

14. The membrane electrode assembly according to claim 13, wherein on the electrolyte membrane, the platinum-containing layer (II) and the metal oxycarbonitride-containing layer (I) are laminated in this order.

15. A fuel cell comprising the membrane electrode assembly according to claim 13.

16. A polymer electrolyte fuel cell comprising the membrane electrode assembly according to claim 13.

* * * * *